(12) United States Patent
Lindsay et al.

(10) Patent No.: US 6,226,639 B1
(45) Date of Patent: May 1, 2001

(54) SYSTEM AND METHOD FOR HYBRID HASH JOIN USING OVER-PARTITIONING TO RESPOND TO DATABASE QUERY

(75) Inventors: Bruce Gilbert Lindsay; Sridhar Rajagopalan; Eugene Jon Shekita, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,741

(22) Filed: Sep. 22, 1998

(51) Int. Cl.$^7$ .................................................. G06F 17/30
(52) U.S. Cl. ......................................... 707/5; 707/1
(58) Field of Search ............................................. 707/1–5

(56) References Cited

U.S. PATENT DOCUMENTS

| | | | |
|---|---|---|---|
| 4,497,039 | 1/1985 | Kitakami et al. ........................ | 707/2 |
| 5,121,494 | 6/1992 | Dias et al. ................................ | 707/2 |
| 5,241,648 | 8/1993 | Cheng et al. ............................. | 707/7 |
| 5,345,585 | 9/1994 | Iyer et al. ................................ | 707/2 |
| 5,537,589 | 7/1996 | Dalal ...................................... | 707/101 |
| 5,666,525 | 9/1997 | Ross ........................................ | 707/2 |
| 5,802,357 | 9/1998 | Li et al. .................................... | 707/2 |
| 5,873,074 | * 2/2000 | Kashyap et al. ........................ | 707/2 |

OTHER PUBLICATIONS

Publication: "The Effect of Bucket Size Tuning in the Dynamic Hybrid GRACE Hash Join Method." Kitsuregawa et al. Proceedings of the Fifteenth International Conference on Very Large Data Bases. Amsterdam, 1989.
Book: "Computers and Intractability, A Guide to the Theory of NP–Completeness." Garey et al. pp. 121–148. 1979.
Book: "Integer and Combinational Optimization." Nemhauser et al. pp. 433–456. Wiley Interscience Series in Discrete Mathematics and Optimization. 1998.
Publication: "A Hash Join Technique for Relational Database Systems." Yasuo Yamane. pp. 515–528. Undated.
Publication: "Query Optimization in Database Systems." Jarke et al. pp. 111–152. Computing Surveys, vol. 16, No. 2, Jun. 1984.
Publication: "An Adaptive Hash Join Algorithm for Multiuser Environments." Zeller et al. pp. 186–197. Proceedings of the 16th VLDB Conference. Brisbane, Australia, 1990.

(List continued on next page.)

*Primary Examiner*—Hosain T. Alam
*Assistant Examiner*—Jean Bolte Fleurantin
(74) *Attorney, Agent, or Firm*—John L. Rogitz

(57) ABSTRACT

A system and method for joining a build table to a probe table in response to a query for data includes over partitioning the build table into "N" build partitions using a uniform hash function and writing the build partitions into main memory of a database computer. When the main memory becomes full, one or more partitions is selected as a victim partition to be written to disk storage, and the process continues until all build table rows or tuples have either been written into main memory or spilled to disk. Then, a packing algorithm is used to initially designate never-spilled partitions as "winners" and spilled partitions as "losers", and then to randomly select one or more winners for prospective swapping with one or more losers. The I/O savings associated with each prospective swap is determined and if any savings would be realized, the winners are designated as losers the losers are designated as winners. The swap determination can be made multiple times, e.g., 256, after which losers are moved entirely to disk and winners are moved entirely to memory. At the end of the swapping, probe table rows associated with winner partitions are joined to rows in the winner build partitions while probe table rows associated with loser partitions are spilled to disk. Then, the loser build partitions are written to main memory for joining with corresponding probe table partitions, to undertake the requested join of the build table and probe table in an I/O- and memory-efficient manner.

40 Claims, 6 Drawing Sheets

DATA STORAGE CONFIGURATION DURING BUILD

OTHER PUBLICATIONS

Publication: "Sort–Merge–Join: An Idea Whose Time Has(h) Passed?" Graefe. pp. 406–417. IEEE 1063–6382. 1994.

Publication: "Tradeoffs in Processing Complex Join Queries via Hasing in Multiprocessor Database Machines." Schneider et al. pp. 469–480. Proceedings of the 16th VLDB Conference. Brisbane, Australia, 1990.

Publication: "Hashing Methods and Relational Algebra Operations." Bratbergsengen. pp. 323–333. Proceedings of the Tenth International Conference on Very Large Data Bases. Singapore, Aug., 1984.

Publication: "Practical Skew Handling in Parallel Joins." DeWitt et al. pp. 27–40. Proceedings of the 18th VLDB Conference. Vancouver, British Columbia, Canada, 1992.

Publication: "Implementation Techniques for Main Memory Database Systems." DeWitt et al. pp. 1–8, ACM 0–89791–128–8/84/006/0001. 1984.

Publication: "Hash–Partitioned Join Method Using Dynamic Destaging Strategy." Nakayama et al. pp. 468–478. Proceedings of the 14th VLDB Conference. Los Angelos, CA. 1988.

Publication: "Multiprocessor Hash–Based Join Algorithms." DeWitt et al. pp. 151–164. Proceedings of VLDB Conference. Stockholm. 1985.

Masaya N. et al.; Hash Partitioned Join Method Using Dynimic Destaging Strategy; Institute of Industrial Science; University of Tokio, 1988.*

* cited by examiner

Fig. 2

DEPARTMENT TABLE (38)

| DEPT. DNO (DEPT. NO.) (40) | DEPT. NAME (DEPT. NAME) (42) | DEPT. BUDGET (DEPT. BUDGET) (44) |
|---|---|---|
| 01 | PERSONNEL | $XX |
| 02 | OPERATIONS | $YY |
| ⋮ | ⋮ | ⋮ |
| N | ADMINISTRATION | $ZZ |

Fig. 3

EMPLOYEE TABLE (46)

| EMP. DNO (EMPLOYEE'S DEPT. NO.) (48) | EMP. NAME (EMPLOYEE'S NAME) (50) | EMP. SAL (EMPLOYEE'S SALARY) (52) |
|---|---|---|
| 01 | SMITH | $AA |
| 02 | JONES | $BB |
| ⋮ | ⋮ | ⋮ |
| 01 | EMPLOYEE M | $MM |

OVERALL FLOW

DATA STORAGE CONFIGURATION DURING BUILD

DATA STORAGE CONFIGURATION AFTER BUILD

Fig. 6   DETERMINE NUMBER OF PARTITIONS N
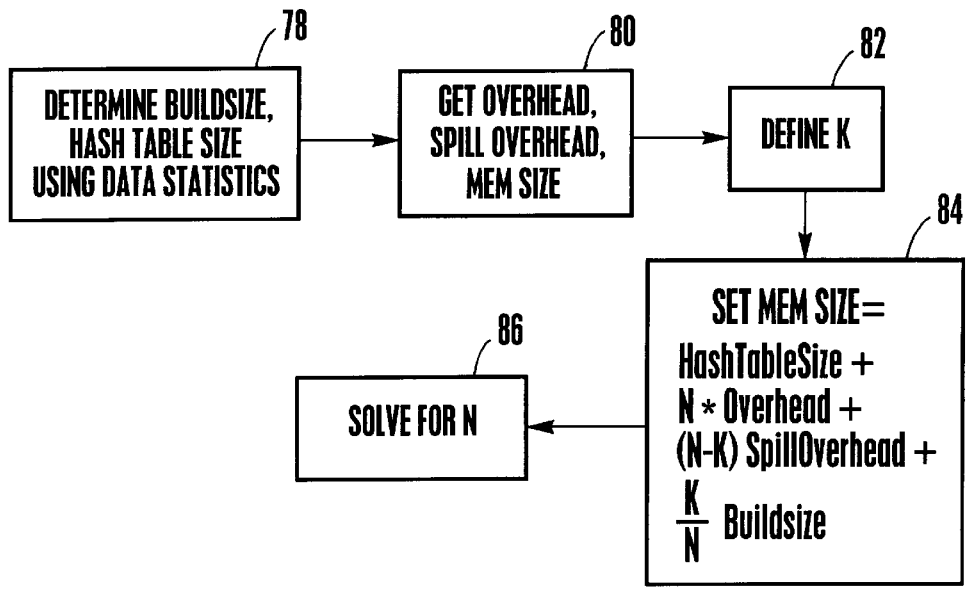
Fig. 7   DETERMINING SPILL VICTIMS
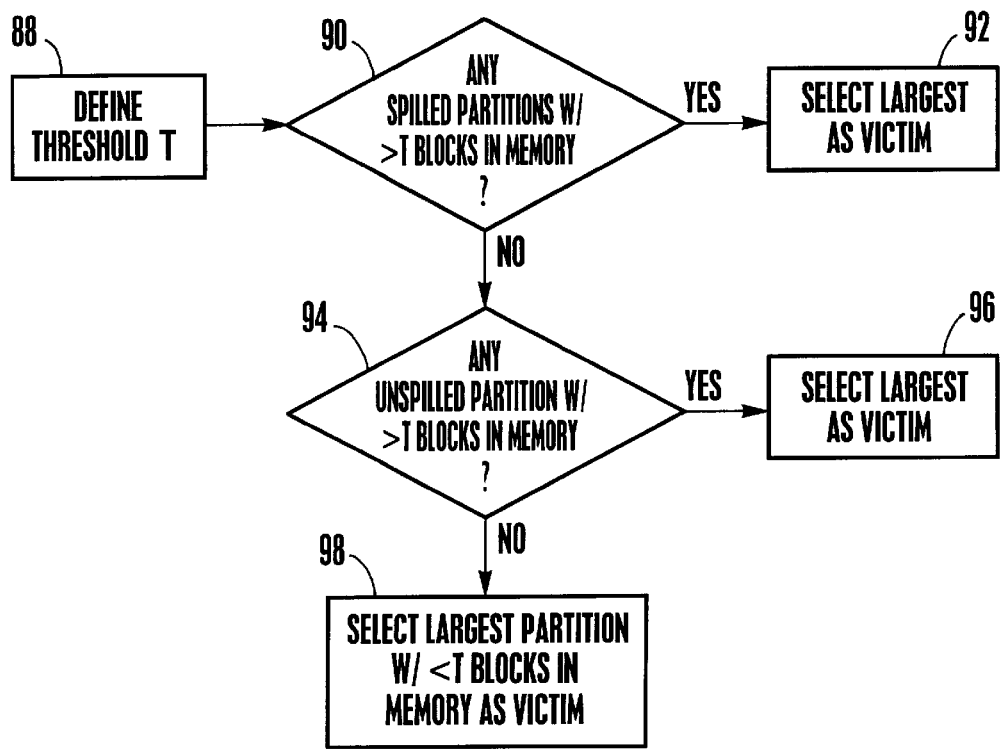

SYSTEM AND METHOD FOR HYBRID HASH JOIN USING OVER-PARTITIONING TO RESPOND TO DATABASE QUERY

BACKGROUND OF THE INVENTION

1. Field of the Invention

The present invention relates generally to computer database systems, and more particularly to systems and methods for executing multi-table joins in response to a query to a computer database for information.

2. Description of the Related Art

When a user requests data from a database by submitting a query to the database, it is often necessary that the database management system (dbms) that is associated with the database combine, i.e., join, data from two or mere tables that contain data. For example, it might be desired to know the names and salaries of employees in a company, by department. Using the database query language known as "SQL", two tables could be created as follows:

"create table DEPT (DNO, NAME, BUDGET)", where DNO is an integer representing the department number, NAME is a variable character alpha-numeric name of the department, and BUDGET is a floating point variable representing the department's budget; and "create table EMP (DNO integer, NAME varchar, SALARY float)", where DNO is an individual employee's department number, NAME is the employee's name, and SALARY is the employee's salary.

Thus, in the above example, the relevant data is arranged in a "department" table and in an "employee" table. In the "department" table, each row has the above-listed three department entries, and in the "employee" table, each row has entries corresponding to a particular employee's department number, name, and salary. To return the employee names and individual salaries by department number requires joining at least one column from the "department" table with at least one column from the "employee" table.

In the particular example discussed above, the department number entry from the "department" table is commonly referred to as a key (it defines a department), whereas the individual employees' department numbers are referred to as foreign keys (they define the respective departments in which the employees work). The columns DEPT.DNO and EMP.DNO establish a join key, and a row in the "department" table is joined to a row in the "employee" table only if the rows match on the join key, that is, only if DEPT.DNO=EMP.DNO for that row. The above-described join can be undertaken to associate employees by department using the following join query syntax:

select DEPT.NAME//department name
   EMP.NAME//employee name
   EMP.SALARY//employee salary
from DEPT, EMP//the two tables discussed above
where DEPT.DNO=EMP.DNO//such that the employee department number equals a department number in the "department" table The result of the above join is a third table in which employee names and salaries have been associated with department names by joining a row in the department table with a corresponding row in the employee table.

A method known to those skilled in the art for effecting the above-described join is referred to as "hybrid hash". Using a hybrid hash scheme, the smaller of two tables to be joined is designated a build table, and the other table is designated a probe table. Either table can be a base table, i.e., a table stored in the database, or a derived table, i.e., a table that is the result of a previous, intermediate join, or other query operations. In any case, if the entire build table can be stored in the main memory of the dbms computer, it is written into main memory, and the probe table is then checked against it for matches on the join key using a hash table on the join key.

Often, however, the entire build table is too large to be written into the main memory of the dbms computer. Under these circumstances, only a single partition of the build table is written into memory. To effect this, the build table is scanned and each row is hashed on its join key to establish one large partition that is written into memory and several smaller partitions that are written to disk. Stated differently, a join key mathematically operates on each of the rows of the build table in accordance with a hash function to yield respective hash values, with rows having a common range of hash values with each other being grouped together in a "partition".

Conventionally, a non-uniform hash function is used to generate "N" partitions, denoted $B_1, B_2, \ldots, B_N$. The reason the conventional hash function is non-uniform is that the first partition $B_1$, is special, in that it is sized to be just less than the size of the memory of the dbms computer for reasons that will be explained shortly. The remaining partitions are equally sized and are stored in disk, since the first partition B. essentially consumes all non-disk memory (except for a small portion that is reserved for subsequent staging to disk of the partitions $B_2, \ldots B_N$).

After the build phase of a table join, the probe phase is undertaken. During the probe phase, the same hash function that was used during the build phase is used to divide the probe table into partitions $P_1, P_2, \ldots, P_N$, and then rows of each probe partition $P_i$ are joined to rows of the corresponding build partition $B_i$ that match on the join key. More particularly, when a probe table row is hashed on its join key and the resulting value maps to the first probe table partition $P_1$, the main-memory hash table partition $B_1$ is searched to determine whether a match exists, and if so, the probe and build rows are joined and output. On the other hand, if the hash value of a probe table row maps to any probe partition $P_i$ other than the first partition $P_1$, the probe table row is spooled to a small staging area in main memory before being written to disk. After all rows in the first probe partition $P_1$ have been checked against the first build partition $B_1$, the next build partition $B_i$ is written into memory from disk, a main-memory hash table is constructed based on it, and then the corresponding probe partition $P_i$ is scanned to check its rows for matches with the rows of the build table $B_i$. The process is repeated until all build partitions have been serially written into main memory and checked.

As recognized by the present invention, the performance of the above-described conventional table join depends on how well the size of the first build partition $B_1$ matches the size of the main memory, because data that hashes to the remaining partitions must be written to and read from disk, and it is desirable for efficiency considerations to minimize such input/output (I/O) operations. Thus, to minimize such I/O operations, the size of the first build partition ideally matches the size of the main memory (less space for overhead and staging). As recognized herein, however, a "good" match is not always effected as well as might be hoped, because the values used in the hash function are based on database statistics that are only approximate, and consequently the actual size of the first build partition can be greater or smaller than expected. When the size of the first partition exceeds the size of the main memory, a memory overflow results; when it is smaller than memory, I/O for probe tuples is not optimized. Either way, performance is degraded.

In a paper entitled "The Effect of Bucket Size Tuning in the Dynamic Hybrid of GRACE Hash Join Method" by Kitsuregawa et al., published in the Proceedings of the Fifteenth Int'l Conf. on Very Large Data Bases (1989), to address the first of the above-mentioned problems, namely, memory overflow, it is suggested to overpartition the build table. Essentially, Kitsuregawa et al. propose dividing the build table into many small partitions and, thus, avoiding any one partition overflowing memory. Unfortunately, Kitsuregawa et al. do not consider the second of the above-noted problems, namely, efficiently packing memory so that I/O is minimized during processing of the probe table. Fortunately, the present invention recognizes that the above-noted problems can be addressed.

SUMMARY OF THE INVENTION

The invention is a general purpose computer system programmed according to the inventive steps herein to efficiently join a build table to a probe table in response to a user query for data. The invention can also be embodied as an article of manufacture—a machine component—that is used by a digital processing apparatus and that tangibly embodies a program of instructions that are executable by the digital processing apparatus to establish a hash table in main memory from the build table. This invention is realized in a critical machine component that causes a digital processing apparatus to perform the inventive method steps herein.

As disclosed in detail below, the computer system includes at least one computer having at least one main memory defining a memory size. The computer also has at least one data storage disk. One or more input devices are associated with the computer for generating a user query for data stored in at least a probe table and a build table, each defining a respective table size. These tables are accessible by the computer. Moreover, the computer includes logic means that can be executed for establishing build partitions in the main memory and the disk when the build table size is greater than the main memory size. In this invention, the logic means are embodied in a program stored on the computer readable medium. These code elements of the logic means include computer readable partition means for determining a number "N" of build partitions $B_1, B_2, \ldots, B_N$ of the build table. Also, hash means are provided for applying a preferably uniform hash function to join keys of the build table to establish the build partitions $B_1, B_2, \ldots, B_N$, and write means can write at least portions of the build partitions $B_1, B_2, \ldots, B_N$ into the main memory. Furthermore, spill means select at least one build partition as a victim partition when the main memory is filled before each partition is written in its entirety to main memory. The victim partition is spilled to the disk. Packing means are provided for designating, after all build partitions $B_1, B_2, \ldots, B_N$ have been written to main memory or spilled to disk and before a probe phase is undertaken, at least some partitions are designated as winners to be kept in main memory during the probe phase.

Additionally, at least some partitions are designated as losers to be written from main memory to disk. The probe phase is then conventionally executed. More specifically, the probe table is hashed and checked against the build partitions for one or more join key matches during the probe phase. With this in mind, the logic means further includes probe means for joining at least some rows of the probe table to respective rows of the build partitions during the probe phase in response to the query.

Preferably, the partition means includes means for accessing a spill number "K" and determining the number "N" of build partitions based at least in part on a product of the spill number "K" and a main memory overhead number "Spill-Overhead" that is associated with staging, in main memory, at least one victim partition during the probe phase. Continuing with the summary of the preferred computer system, the spill means can include first means for determining whether the main memory contains more than "T" blocks of at least one previously spilled partition, and if so, designating at least a largest one of any such previously spilled partitions as a victim partition. Further, the spill means can include second means for determining, when the first means fails to designate any victim partitions, whether the main memory contains more than "T" blocks of at least one previously unspilled partition. If so, the second means designates at least a largest one of any such previously unspilled partitions as a victim partition. Still further, the preferred spill means includes means for designating as a victim partition, when the second means fails to designate any victim partitions, a largest partition in main memory with less than "T" blocks in main memory.

With respect to the preferred packing means, initialization means are provided for initializing at least some build partitions as winners and at least some build partitions as losers. Also, prospective swap means randomly select one or more winners and one or more losers as loser and winner candidates, respectively, for a prospective swap. By "prospective" is meant that loser candidates would be written from main memory to disk and winner candidates would be written from disk to main memory, provided the following criterium below is met. Swap determining means determine an efficiency savings of the prospective swap, and loser candidates are designated as losers and winner candidates designated as winners based on the efficiency savings.

In a particularly preferred embodiment of the packing means, the initialization means initializes never-spilled partitions as winners and spilled partitions as losers. Also, a single winner can be swapped for more than one loser and a single loser swapped for more than one winner.

In another aspect, a computer-implemented method is disclosed for efficiently joining a probe table to a build table in response to a database query for information. The method includes establishing plural winner partitions of the build table in a computer main memory, prior to joining the probe table with the build table. Also, the method includes establishing one or more loser partitions of the build table on a computer disk. Moreover, the method includes substantially optimizing a mix of winner partitions and loser partitions prior to joining the tables. A computer system that undertakes the method is also disclosed.

In still another aspect, a computer program device includes a computer program storage device that is readable by a digital processing apparatus, and a program means on the program storage device. The program means includes instructions that can be executed by the digital processing apparatus for performing method steps for joining a probe table to a build table in a probe phase in response to a database query for information. These method steps include over partitioning the build table into plural build partitions, more than one of which is written in a computer main memory prior to the probe phase and at least one of which is at least partially written to at least one computer disk when the main memory becomes substantially full. One or more prospective swaps are proposed, wherein one or more partitions fully or partially in main memory is a candidate for removal to the disk pursuant to the swap and one or more partitions fully or partially on the disk is a candidate for removal to the main memory pursuant to the swap. The swap is executed if an efficiency is realized thereby. A computer system for executing the computer program device is also disclosed.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of an exemplary build table;

FIG. 3 is a schematic diagram of an exemplary probe table;

FIG. 6 is a flow chart of the logic for determining the number "N" of partitions;

FIG. 7 is a flow chart of the logic for determining what build table partitions will be spilled to disk;

DETAILED DESCRIPTION OF THE PREFERRED EMBODIMENTS

Figure 1:
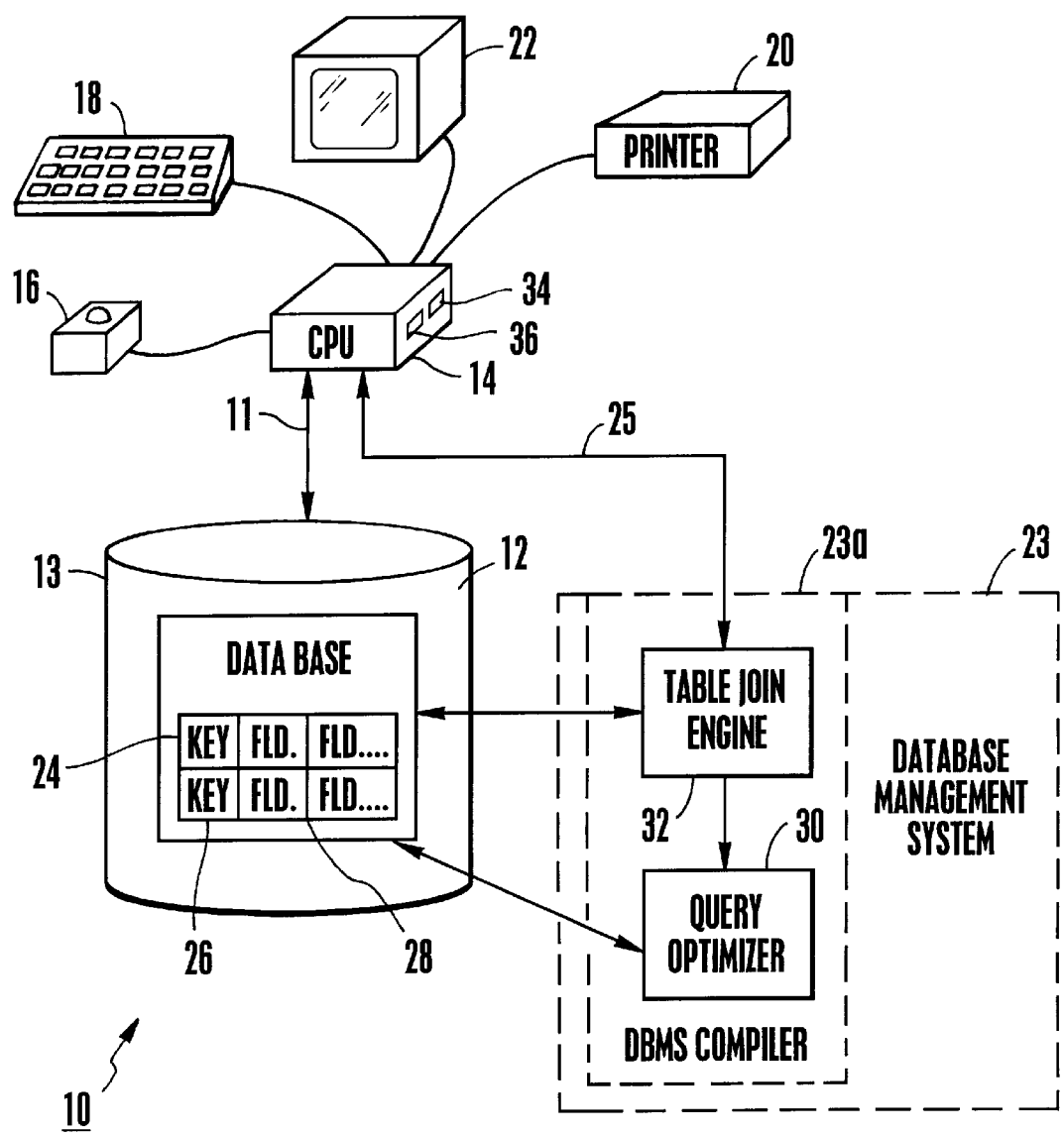
FIG. 1 is a schematic diagram of the present system for efficiently joining database tables.

Referring initially to FIG. 1, a system is shown, generally designated 10, for accessing, via a path 11, data elements from a database 12 for responding to a database query by joining two or more tables composed of data elements. The data elements may reside, for example, in one or more storage devices such as the device 13. More specifically, the data elements can reside in a single storage, or the data elements can be distributed across many storages in a parallel processing system.

In the particular architecture shown, the system 10 includes a digital processing apparatus, such as a computer 14. In one intended embodiment, the computer 14 may be a personal computer made by International Business Machines Corporation (IBM) of Armonk, N.Y., or the computer 14 may be any computer, including computers sold under trademarks such as AS400, with accompanying IBM Network Stations. Or, the computer 14 may be a Unix computer, or OS/2 server, or Windows NT server, or IBM RS/6000 250 workstation or an IBM laptop computer.

As shown in FIG. 1, the computer 14 is electrically connected to one or more input devices, e.g., a mouse 16 and a keyboard 18, which can be manipulated by a user of the system 10 to generate requests for data that explicitly or implicitly define a request for data from plural data tables, for example, the tables shown in FIGS. 2 and 3 and discussed further below. The results of the table join can be output via an output device such as a printer 20 or monitor 22 that are conventionally coupled to the computer 14.

In one implementation of the present invention, a database management system (dbms) 23 of the compiling kind executes in the computer 14, receiving, among other things, user requests that contain database queries. The dbms 23 processes the queries, providing access to the database 12. The dbms 23 includes a compiler 23a, which may also be referred to as a "bind" component.

FIG. 1 shows that the storage device containing the database 12 electronically stores a plurality of data records 24, commonly referred to as tuples. Each data record 24 can include a key 26 and a plurality of field elements 28, commonly referred to as attributes. For example, each data record 24 may contain personnel information, with the fields 28 containing values for attributes of the person such as department number, salary, and so on. The data elements can be stored as tables, or they can be otherwise stored and then arranged in build and probe tables, as discussed further below, just prior to executing the present logic.

As disclosed previously, the present system and method for undertaking table joins has many applications. In but one illustrative use of the present invention, the user might want to retrieve information from the database 12 by generating a query, and to do so the user manipulates the mouse 16 or keyboard 18 as appropriate. Typically, a query is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the dbms compiler 23a.

During compilation, the computer 14 receives the application program and forwards the query statements over an information path 25 to a query optimizer 30 that is included in the compiler 23a for determining how to efficiently retrieve the requested data. As but one example, the query optimizer can be one of the optimizers discussed by Jarke et al. in "Query Optimization in Database Systems", 16 *ACM Computing Surveys* 2 (June 1984).

As intended by the present invention, the dbms compiler 23a includes a table join engine 32 coupled to the query optimizer 30. It is to be understood that the components such as the query optimizer 30 and table join engine 32 can be included in dbms compiler software contained in an appropriate electronic data storage that includes, e.g., a hard disk drive 34 and optical disk drive 36 conventionally coupled to the computer 14.

In accordance with the method described below, the query optimizer 30 uses the table join engine 32 to partition at least one build table into "N" partitions, and then arranges the storage of the partitions between a main memory of the computer 14 and disk memory of the computer 14 such that a minimum of input/output operations between main memory and disk is required, to optimize the table join.

The flow charts herein illustrate the logic structure of the table join generator of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the table join engine 32 may be a computer program that is executed by a processor within the computer 14 as a series of computer-executable instructions. In addition to the drives 34, 36, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

FIGS. 2 and 3 show examples of two tables that are sought to be joined in response to a query. Specifically, FIG. 2 shows a department table having a department number column 40 that contains numeric department designations, a department name column 42 that contains alpha-numeric strings representing department names, and a department budget column 44 that contains character strings representing department budgets. It is to be understood that entries in a single row in the department table 38 are correlated to each other.

In contrast, FIG. 3 shows an employee table 46 having an employee department number column 48 that contains numeric department designations of departments in which employees work. Also, the employee table 46 has an employee name column 50 that contains alpha-numeric strings representing names of individual employees, and an employee salary column 52 that contains character strings representing employee salaries. It is to be understood that entries in a single row in the employee table 46 are correlated to each other.

For illustration purposes, assume that a user inputs a query by means of one or more of the input devices 16, 18 shown in FIG. 1 for a listing of all employees names, along with their salaries and the names of their departments. To respond to the query, the department table 38 must be joined with the employee table 46. It is the purpose of the present invention to undertake this join efficiently, from a standpoint of memory usage and input/output (I/O) efficiency. In this example, the department table 38 establishes a build table by virtue of it being smaller than the employee table 46, with the employee table 46 establishing a probe table.

Figure 4:
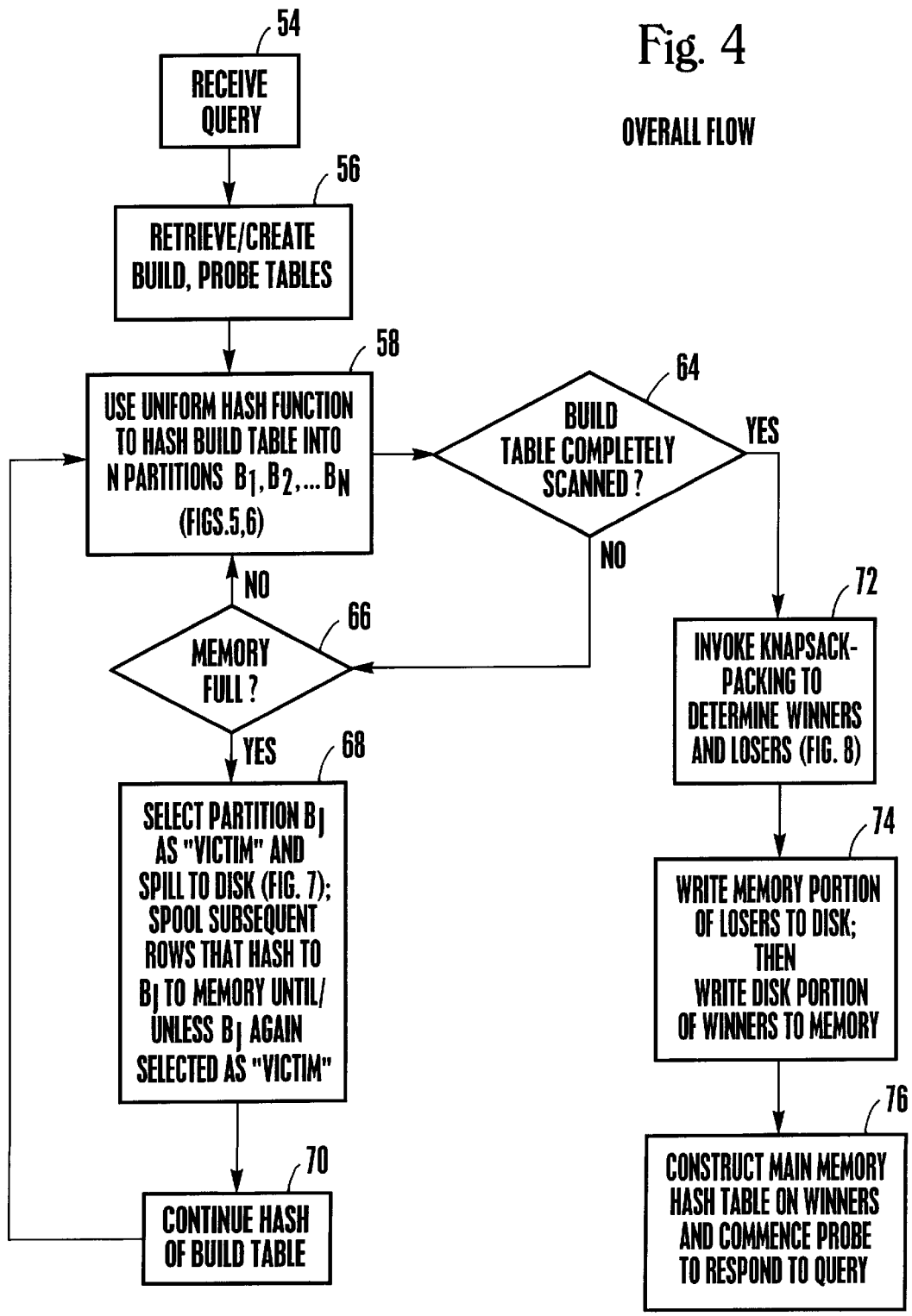
FIG. 4 is a flow chart of the overall logic of the invention.

The overall flow of the present logic is shown in FIG. 4. Commencing at block 54, a user query for data is received. When the query optimizer 30 (FIG. 1) determines that a table join is required to respond to the query, the logic moves to block 56 to retrieve or, if necessary, create the build and probe tables (e.g., the department and employee tables 38, 46) from the database 12.

Figure 5:
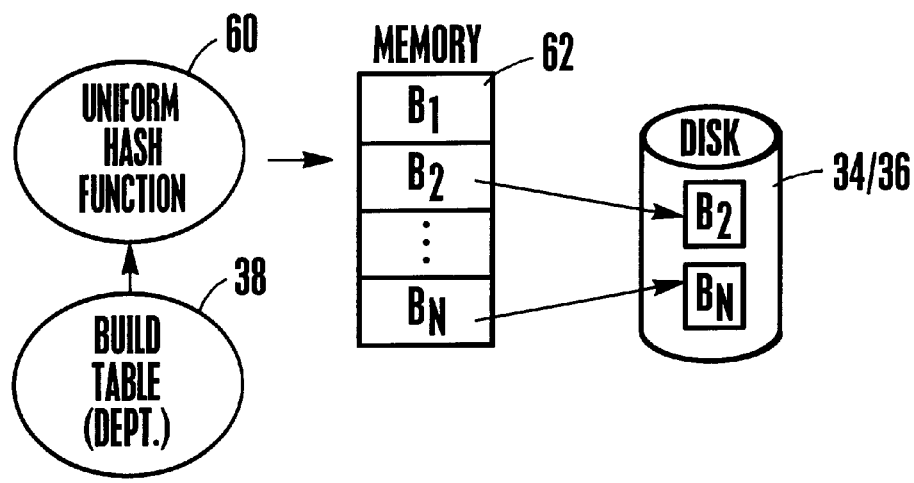
FIG. 5 is a schematic diagram of the system during the build phase.

Proceeding from block 56 to block 58 and referring to FIGS. 4 and 5, the logic next uses any appropriate uniform hash function 60 to hash the join keys of the build table row by row into a main memory 62 of the database computer, e.g., the computer 14. As indicated in FIG. 4 and as shown in FIG. 5, the hash function results in grouping the rows of the build table in "N" build partitions $B_1, B_2, \ldots, B_N$. FIG. 6 below more fully discusses how a value for "N" is obtained.

Periodically during the hash process, e.g., after a row has been hashed, the logic determines, at decision diamond 64 in FIG. 4, whether the hash of the build table has been completed. If not, the logic moves to decision diamond 66, to determine whether the main memory 62 is full, that is, whether the main memory 62 has been filled with rows of the build table, with the exception of a relatively small portion of main memory that is reserved for overhead.

If the main memory 62 is not full, the process loops back to block 58 to continue hashing the build table into main memory 62. On the other hand, if the logic determines, at decision diamond 66, that the main memory 62 has been filled, the logic proceeds to block 68.

At block 68, the logic selects a partition $B_j$ as a victim partition using logic discussed more fully in FIG. 7 below. The import of this selection is that the rows of the victim partition $B_j$ that have already been hashed are deleted from main memory 62 and written to one or more of the disks 34, 36. In other words, the rows of the victim partition $B_j$ that have already been hashed are "spilled" from main memory 62 to disk 34/36. FIG. 5 illustrates an example in which two partitions—$B_2$ and $B_N$—have been designated as victim partitions and spilled to disk.

As indicated at block 68 in FIG. 4, after a partition $B_j$ has been selected as a victim partition and its rows currently in main memory spilled to disk, subsequent rows of the victim partition $B_j$ (i.e., subsequent rows of the build table that hash to the victim partition $B_j$) are spooled to main memory 62 as they are hashed. Thus, the subsequent rows of the partition $B_j$ are not spooled to disk 34/36, unless and until the partition is once again selected for spilling to disk during subsequent loops in the logic. After spilling the victim partition $B_j$ to disk at block 68, the process moves to block 70 to continue hashing the build table row by row into main memory 62, looping back to block 58 and proceeding as described above.

When it is determined at decision diamond 64 that the entire build table has been hashed, the logic moves to block 72 to invoke a so-called "knapsack-packing" algorithm as detailed in FIG. 8 below. As described therein, the packing algorithm initially constructs a list of "winners", that is, partitions that prospectively will remain in main memory 62 or, if on disk, will be moved to main memory prior to undertaking the probe phase of the join. Also, the packing algorithm initially constructs a list of "losers", that is, partitions that prospectively will remain on disk or, if in main memory 62, will be moved to disk prior to undertaking the probe phase of the join. The results of the packing algorithm are indicated at block 74, which indicates that when one or more winners is to be moved from disk to main memory, one or more losers are first moved from main memory to disk. In other words, one or more winners are swapped with one or more losers, provided that, as explained further below, an efficiency is realized thereby. Accordingly, the skilled artisan can now appreciate that the packing algorithm optimizes a mix of winner partitions and loser partitions prior to joining the tables, to promote the best use of main memory 62 while limiting otherwise inefficient I/O operations between disk and main memory.

From block 74 the logic moves to block 76 to construct a main memory hash table on the winners. The logic then commences the probe phase of a table join in accordance with probe principles known in the art.

The details of determining the number "N" of partitions are shown in FIG. 6. Commencing at block 78, two variables herein denoted "BuildSize" (the estimated size in blocks of the build table) and "HashTableSize" (the estimated size in blocks of the main memory hash table, a function of how many different join key values are expected in the build table) are derived using data statistics known in the art, for example, as set forth the above-referenced publication of Jarke et al. Proceeding to block 80, three additional variables are obtained. The first of these variables is referred to herein as "Overhead", which is a block size associated with each partition. Also, a variable referred to herein as "SpillOverhead", which is a block size associated with each spilled partition including staging areas used during the probe phase, is obtained. Thus, the variable "SpillOverhead" is associated with staging, in main memory, at least one victim partition during the probe phase.

Moreover, a variable "MemSize" is obtained. The variable MemSize represents the amount of main memory 62 that is available for hash join. Per the present invention, variables Overhead and SpillOverhead are constants that are implementation dependent, whereas the variable MemSize is provided by a memory manager in accordance with memory size estimation principles known in the art.

In one particularly preferred embodiment, exemplary values (in bytes) for the above variables are as follows:

MemSize=1 Mbyte SpillOverhead=4 Kbyte HashTableSize=10 KBytes BuildSize=5 Mbytes Overhead=100 bytes Moving from block 80 to block 82, the logic next defines a spill number "K". The spill number K is an estimate of the number of partitions sought to be stored in main memory 62 at the end of the packing phase, with a large spill number K thus implying a small partition size. As recognized by the present invention, a tradeoff exists between partition size and I/O cost. Specifically, the smaller the size of the partitions, the tighter the main memory 62 can be packed with partitions by the packing algorithm, but at the expense of increased partition management costs. Stated differently, the efficiency of main memory use is promoted by small partition sizes, but excessively small partitions entail excessive management costs. With this in mind, we have discovered that a value for K of ten (10) is about optimal.

From block 82, the logic moves to block 84 to solve the below equation for N, using quadratic algebra:

MemSize=HashTableSize+N(Overhead)+(N−K)(SpillOverhead)+ (K/N)(BuildSize)

An upper bound for N, e.g., one hundred (100), is defined that ensures that the cost of managing partitions on disk is enforced. If the above equation has only imaginary solutions, then "N" can be set equal to the upper bound.

Now referring to FIG. 7, the logic by which spill victims are selected can be seen. Commencing at block 88, a threshold number "T" is defined. In the preferred embodiment, Athe threshold number "T" is an estimated size threshold, in blocks, for efficient disk to memory I/O. In a particularly preferred embodiment, the threshold number "T" is defined to be eight (8) blocks.

From block 88 the logic moves to decision diamond 90, wherein it is determined whether the main memory contains more than "T" blocks of at least one previously spilled partition. If so, the logic moves to block 92 to designate the largest one of any such previously spilled partitions as a victim partition.

On the other hand, when no victim partitions are designated at decision diamond 90, the logic moves to decision diamond 94 to determine whether the main memory contains more than "T" blocks of at least one previously unspilled partition. If so, a largest one of any such previously unspilled partitions is designated as a victim partition at block 96. Otherwise, the largest partition in main memory with less than "T" blocks in main memory is designated as a victim partition at block 98. With this logic in mind, the present invention understands that the highest priority in selecting a spill victim should be given to those partitions meeting the requirements of decision diamond 90, because it is unlikely that such partitions will later be swapped into main memory by the packing algorithm disclosed in detail below. In-contrast, small partitions that have never spilled are unlikely to be swapped, so they are given the lowest priority for selection as spill victims.

Figure 8:
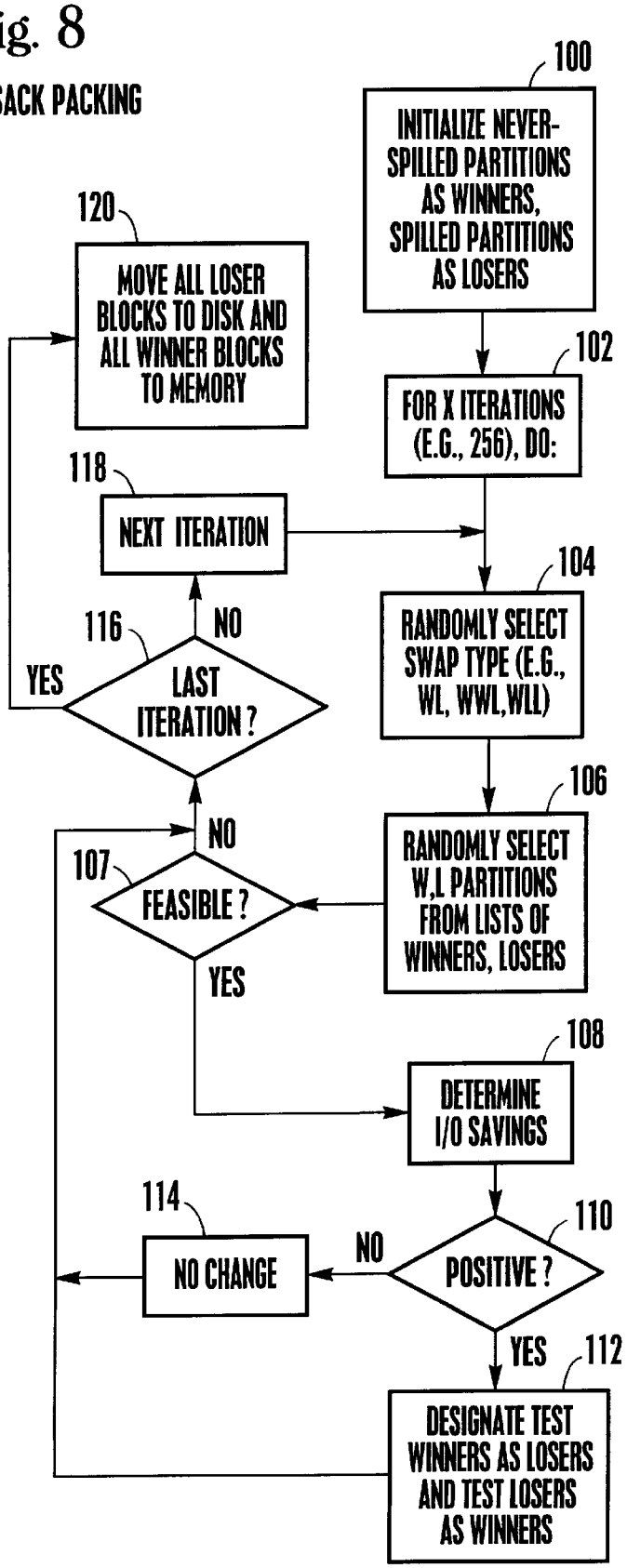
FIG. 8 is a flow chart of the present packing logic for determining what build table partitions are to be stored in main memory at the start of the probe phase.

FIG. 8 shows the preferred operation of the packing algorithm. Commencing at block 100, all never-spilled partitions are initialized as "winners" and any partition that has been partially or completely spilled to disk is initialized as a "loser". Moving to block 102, the process enters an iterative DO loop to undertake the subsequent steps a predetermined number of times, e.g., 256 times.

The loop after initialization begins at block 104, wherein a proposed swap type is randomly selected. For example, a proposed swap might be one winner for one loser ("WL"), or two winners for one loser ("WWL"), or one winner for two losers ("WLL"). As recognized by the present invention, by allowing swaps between one winner and two losers or two winners and one loser, the list of winners is allowed to grow and shrink, which we have discovered can significantly improve the results of the subsequent probe phase.

At block 106 test winner partitions are randomly selected as loser partition candidates, and test loser partitions are randomly selected as winner partition candidates, with the number of winner and loser candidates being established by the prospective swap type at block 104. Next, at decision diamond 107, it is determined whether the proposed swap is feasible, e.g., whether the swap, if executed, would overflow memory (and thus be unfeasible).

If the proposed swap is feasible, the logic moves to block 108, at which a prospective efficiency, preferably a prospective I/O savings that would accrue were the winner and loser candidates actually swapped with each other (that is, present winners moved from memory to disk and present losers moved from disk to memory) is determined. Thus, the present packing algorithm accounts for the I/O cost of swapping partitions between memory and disk as well as the benefit of a larger main memory hash table resulting from those swaps.

The preferred prospective efficiency determination at block 108 (with comments) is as follows:

I/O savings =  2(Ratio)(LoserBlocks-WinnerBlocks) + //
               I/O savings in probe phase
               WinnerDiskBlocks - WinnerMemBlocks + //
               I/O to move winner(s) to disk
               LoserMemBlocks - LoserDiskBlocks//
               I/O to move loser(s) to memory,
wherein
Ratio = ratio of blocks in probe table to blocks in build table, derived from
database statistics;
WinnerMemBlocks = number of blocks in memory belonging to winner partitions, obtained during the build phase;
WinnerDiskBlocks = number of blocks on disk belonging to winner partitions, obtained during the build phase;
WinnerBlocks = total number of winner blocks, i.e., WinnerMemBlocks + WinnerDiskBlocks
LoserMemBlocks = number of blocks in memory belonging to Loser partitions, obtained during the build phase;
LoserDiskBlocks = number of blocks on disk belonging to Loser partitions, obtained during the build phase; and
LoserBlocks = total number of Loser blocks, i.e., LoserMemBlocks + LoserDiskBlocks After determining the I/O savings at block 108, the logic moves to decision diamond 110 to determine whether the savings is positive. If it is, the winners and losers under test exchange roles, with winners being designated as losers and losers being designated as winners under these circumstances. Otherwise, the logic moves to block 114 to indicate that no change in the designations of the winner and loser candidates under test will be made.

From blocks 112 or 114, and from decision diamond 107 when it is determined that the proposed swap would be unfeasible, the logic moves to decision diamond 116 to determine whether the last iteration has been undertaken. If not, the logic moves to block 118 for the next iteration, and then loops back to block 104 as shown. If, on the other hand, the last iteration has been executed, the logic moves from decision diamond 116 to block 120. At block 120, blocks in memory that belong to loser partitions are written to disk and blocks on disk that belong to winner partitions are then written to memory.

Figure 9:
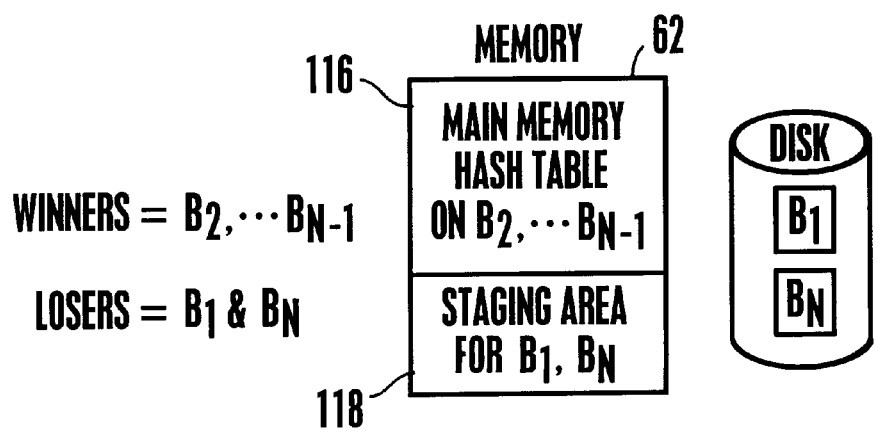
FIG. 9 is a schematic diagram of the system just after the build phase.

The result of the packing discussed above is shown in FIG. 9 and indicated as mentioned previously at block 76 in FIG. 4. After swapping winners and losers, a main memory hash table 116 (FIG. 9) is constructed on the partitions in main memory 62. In the example shown in FIG. 9, former winner (and now loser) partition $B_1$ has been swapped for former loser (and now winner) partition $B_2$, with the former loser partition $B_N$ remaining a loser and all other former winner partitions remaining winners. The hash table 116 substantially fills the main memory 62, except for a portion 118 of the main memory 62 that is reserved as a staging area for the loser partitions during the probe phase. Thus, FIG. 9 depicts the state of the system 10 after the build phase, and before the probe phase is commenced.

While the particular SYSTEM AND METHOD FOR HYBRID HASH JOIN USING OVER-PARTITIONING TO RESPOND TO DATABASE QUERY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer system, comprising:
   at least one computer having at least one main memory defining a memory size, the computer accessing at least one data storage disk;
   one or more input devices associated with the computer for generating a user query for data stored in at least one probe table and at least one build table defining a build table size, the tables being accessible by the computer;
   logic means executable by the computer for establishing build partitions in the main memory and the disk when the build table size is greater than the main memory size, the logic means having:
      partition means for determining a number "N" of build partitions $B_1, B_2, \ldots, B_N$ of the build table;
      hash means for applying a hash function to the build table to establish build partitions $B_1, B_2, \ldots, B_N$;
      write means for writing at least portions of the build partitions $B_1, B_2, \ldots, B_N$ into the main memory;
      spill means for selecting at least one build partition as a victim partition when the main memory is full prior to writing each partition in its entirety to main memory and for spilling the victim partition to the disk; and
      packing means for designating, after all build partitions $B_1, B_2, \ldots, B_N$ have been written to main memory or spilled to disk and before a probe phase is undertaken, at least some partitions as winners to be written from disk to main memory, and designating at least some partitions as losers to be written from main memory to disk.

2. The computer system of claim 1, wherein the probe table is hashed and checked against the build partitions for one or more join key matches during the probe phase, and the logic means further comprises probe means for joining at least some rows of the probe table to respective rows of the build partitions during the probe phase in response to the query.

3. The computer system of claim 1, wherein the hash function is a uniform hash function.

4. The computer system of claim 1, wherein the partition means further comprises means for accessing a spill number "K" and determining the number "N" of build partitions based at least in part on a product of the spill number "K" and a main memory overhead number "SpillOverhead" associated with staging, in main memory, at least one victim partition during the probe phase.

5. The computer system of claim 1, wherein after the victim partition is spilled to disk, blocks of the victim partition processed by the hash means are written to main memory unless and until the victim partition is selected as a victim partition a second time.

6. The computer system of claim 1, wherein the spill means further comprises:
   first means for determining whether the main memory contains more than "T" blocks of at least one previously spilled partition, and if so, designating at least a largest one of any such previously spilled partitions as a victim partition.

7. The computer system of claim 6, wherein the spill means further comprises:
   second means for determining, when the first means fails to designate any victim partitions, whether the main memory contains more than "T" blocks of at least one previously unspilled partition, and if so, designating at least a largest one of any such previously unspilled partitions as a victim partition.

8. The computer system of claim 7, wherein the spill means further comprises:
   means for designating as a victim partition, when the second means for determining fails to designate any victim partitions, a largest partition in main memory with less than "T" blocks in main memory.

9. The computer system of claim 1, wherein the packing means further includes:
   initialization means for initializing at least some build partitions as winners and at least some build partitions as losers;
   prospective swap means for randomly selecting one or more test winners and one or more test losers for a prospective swap, wherein test winners and test losers would exchange designations; and
   swap determining means for determining an efficiency savings of the prospective swap and designating test winners as losers and test losers as winners based on the efficiency savings.

10. The computer system of claim 9, wherein the initialization means initializes never-spilled partitions as winners and spilled partitions as losers, and the packing means further includes means for swapping a single winner for more than one loser and swapping a single loser for more than one winner.

11. A computer-implemented method for efficiently joining a probe table to a build table in response to a database query for information, comprising:

establishing plural winner partitions of the build table in a computer main memory, prior to joining the probe table with the build table;

establishing one or more loser partitions of the build table on a computer disk; and substantially optimizing a mix of winner partitions and loser partitions prior to joining the tables, including swapping at least one single winner partition for at least one loser partition and vice-versa;

overpartitioning the build table into plural build partitions, more than one of which is written in a computer main memory prior to the probe phase and at least one of which is at least partially written to at least one computer disk when the main memory becomes substantially full;

proposing one or more prospective swaps, wherein one or more partitions in main memory is a candidate for removal to the disk pursuant to the swap and one or more partitions on the disk is a candidate for removal to the main memory pursuant to the swap; and executing the swap if an efficiency is realized thereby.

12. The method of claim 11, wherein a single winner partition can be swapped for more than one loser partition and a single loser partition can be swapped for more than one winner partition.

13. The method of claim 11, further comprising:

determining a number "N" of build partitions $B_1, B_2, \ldots, B_N$ of the build table;

applying a uniform hash function to the build table to establish the build partitions $B_1, B_2, \ldots, B_N$;

writing at least portions of the build partitions $B_1, B_2, \ldots, B_N$ into the main memory;

selecting at least one build partition as a victim partition when the main memory is full prior to writing each partition in its entirety to main memory;

spilling the victim partition to the disk; and after all build partitions $B_1, B_2, \ldots, B_N$ have been written to main memory or spilled to disk and before a probe phase is undertaken, designating at least some partitions as winners to be written from disk to main memory, and designating at least some partitions as losers to be written from main memory to disk.

14. The method of claim 13, further comprising accessing a spill number "K" and determining the number "N" of build partitions based at least in part on a product of the spill number "K" and a main memory overhead number "Spill-Overhead" associated with staging, in main memory, at least one victim partition during the probe phase.

15. The method of claim 14, wherein the step of selecting at least one build partition as a victim partition further comprises:

determining whether the main memory contains more than "T" blocks of at least one previously spilled partition, and if so, designating at least a largest one of any such previously spilled partitions as a victim partition.

16. The method of claim 15, wherein the step of selecting at least one build partition as a victim partition further comprises:

when the main memory does not contain more than "T" blocks of a previously spilled partition, determining whether the main memory contains more than "T" blocks of at least one previously unspilled partition, and if so, designating at least a largest one of any such previously unspilled partitions as a victim partition.

17. The method of claim 16, wherein the step of selecting at least one build partition as a victim partition further comprises:

when the main memory does not contain more than "T" blocks of a previously unspilled partition, designating as a victim partition a largest partition in main memory with less than "T" blocks in main memory.

18. The method of claim 17, wherein the step of designating at least some partitions as winners and at least some partitions as losers further includes:

initializing never-spilled build partitions as winners and initializing spilled build partitions as losers;

randomly selecting one or more test winners and one or more test losers for a prospective swap, wherein test winners and test losers would exchange designations; and determining an efficiency savings of the prospective swap and designating test winners as losers and test losers as winners based on the efficiency savings.

19. The method of claim 18, further comprising:

writing winners from disk to main memory; and writing losers from main memory to disk.

20. The method of claim 13, wherein after the victim partition is spilled to disk, blocks of the victim partition subsequently processed during the step of applying a uniform hash function to the build table are written to main memory unless and until the victim partition is selected as a victim partition a second time.

21. A computer program device comprising:

a computer program storage device readable by a digital processing apparatus; and a program means on the program storage device and including instructions executable by the digital processing apparatus for performing method steps for joining a probe table to a build table in a probe phase in response to a database query for information, the method steps comprising:

overpartitioning the build table into plural build partitions, more than one of which is written in a computer main memory prior to the probe phase and at least one of which is at least partially written to at least one computer disk when the main memory becomes substantially full;

proposing one or more prospective swaps, wherein one or more partitions in main memory is a candidate for removal to the disk pursuant to the swap and one or more partitions on the disk is a candidate for removal to the main memory pursuant to the swap; and executing the swap if an efficiency is realized thereby.

22. The computer program device of claim 21, wherein the over partitioning step further comprises:

determining a number "N" of build partitions $B_1, B_2, \ldots, B_N$ of the build table;

applying a uniform hash function to the build table to establish the build partitions $B_1, B_2, \ldots, B_N$; and writing at least portions of the build partitions $B_1, B_2, \ldots, B_N$ into the main memory.

23. The computer program device of claim 22, wherein the method steps further comprise:

selecting at least one build partition as a victim partition when the main memory is full prior to writing each partition in its entirety to main memory; and spilling the victim partition to the disk.

24. The computer program device of claim 23, wherein the proposing step further includes:

designating at least some partitions as winners to be written from disk to main memory, and designating at least some partitions as losers to be written from main memory to disk, wherein a single winner partition can be swapped for more than one loser partition and a single loser partition can be swapped for more than one winner partition.

25. The computer program device of claim 24, wherein the step of determining a number "N" of build partitions further comprises accessing a spill number "K" and determining the number "N" of build partitions based at least in part on a product of the spill number "K" and a main memory overhead number "SpillOverhead" associated with staging, in main memory, at least one victim partition during the probe phase.

26. The computer program device of claim 23, wherein the step of selecting at least one build partition as a victim partition further comprises:
   determining whether the main memory contains more than "T" blocks of at least one previously spilled partition, and if so, designating at least a largest one of any such previously spilled partitions as a victim partition;
   when the main memory does not contain more than "T" blocks of a previously spilled partition, determining whether the main memory contains more than "T" blocks of at least one previously unspilled partition, and if so, designating at least a largest one of any such previously unspilled partitions as a victim partition; and
   when the main memory does not contain more than "T" blocks of a previously unspilled partition, designating as a victim partition a largest partition in main memory with less than "T" blocks in main memory.

27. The computer program device of claim 24, wherein the step of designating at least some partitions as winners and at least some partitions as losers further includes:
   initializing never-spilled build partitions as winners and initializing spilled build partitions as losers;
   randomly selecting one or more test winners and one or more test losers for a prospective swap, wherein test winners and test losers would exchange designations; and
   determining an efficiency savings of the prospective swap and designating test winners as losers and test losers as winners based on the efficiency savings.

28. The computer program device of claim 23, wherein after the victim partition is spilled to disk, blocks of the victim partition subsequently processed during the step of applying a uniform hash function to the build table are written to main memory unless and until the victim partition is selected as a victim partition a second time.

29. A computer system, comprising:
   at least one computer having at least one main memory defining a memory size, the computer accessing at least one data storage disk;
   one or more input devices associated with the computer for generating a user query for data stored in at least a probe table and a build table defining a build table size, the tables being accessible by the computer;
   logic means executable by the computer for establishing build partitions in the main memory and the disk when the build table size is greater than the main memory size, the logic means undertaking:
      establishing plural winner partitions of the build table in the main memory, prior to joining the probe table with the build table;
      establishing one or more loser partitions of the build table in the disk;
      optimizing a mix of winner partitions and loser partitions prior to joining the tables; and
      accessing a spill number "K" and determining the number "N" of build partitions of the build table based at least in part on a product of the spill number "K" and a main memory overhead number "SpillOverhead" associated with staging, in main memory, at least one victim partition during the probe phase.

30. The computer system of claim 29, wherein the logic means further undertake:
   applying a uniform hash function to the build table to establish build partitions $B_1, B_2, \ldots, B_N$;
   writing at least portions of the build partitions $B_1, B_2, \ldots, B_N$ into the main memory;
   selecting at least one build partition as a victim partition when the main memory is full prior to writing each partition in its entirety to main memory;
   spilling the victim partition to the disk; and
   after all build partitions $B_1, B_2, \ldots, B_N$ have been written to main memory or spilled to disk and before a probe phase is undertaken, designating at least some partitions as winners to be written from disk to main memory, and designating at least some partitions as losers to be written from main memory to disk.

31. The computer system of claim 30, wherein the step of selecting at least one build partition as a victim partition undertaken by the logic means further comprises:
   determining whether the main memory contains more than "T" blocks of at least one previously spilled partition, and if so, designating at least a largest one of any such previously spilled partitions as a victim partition;
   when the main memory does not contain more than "T" blocks of a previously spilled partition, determining whether the main memory contains more than "T" blocks of at least one previously unspilled partition, and if so, designating at least a largest one of any such previously unspilled partitions as a victim partition; and
   when the main memory does not contain more than "T" blocks of a previously unspilled partition, designating as a victim partition a largest partition in main memory with less than "T" blocks in main memory.

32. The computer system of claim 30, wherein the step of designating at least some partitions as winners and at least some partitions as losers undertaken by the logic means further includes:
   initializing never-spilled build partitions as winners and initializing spilled build partitions as losers;
   for one or more iterations, randomly selecting one or more test winners and one or more test losers for a prospective swap, wherein test winners and test losers would exchange designations; and
   for each iteration, determining an efficiency savings of the prospective swap and designating test winners as losers and test losers as winners based on the efficiency savings;
   after all iterations, writing losers from main memory to disk and writing winners from disk to main memory, wherein a single winner partition can be swapped for more than one loser partition and a single loser partition can be swapped for more than one winner partition.

33. The computer system of claim 30, wherein after the victim partition is spilled to disk, blocks of the victim partition subsequently processed during the step of applying a uniform hash function to the build table are written to main memory unless and until the victim partition is selected as a victim partition a second time.

34. A computer system, comprising:
   at least one computer having at least one main memory defining a memory size, the computer having at least one data storage disk;
   one or more input devices associated with the computer for generating a user query for data stored in at least a probe table and a build table defining a build table size, the tables being accessible by the computer;
   logic means executable by the computer for establishing build partitions in the main memory and the disk when the build table size is greater than the main memory size, the logic means undertaking:
      overpartitioning the build table into plural build partitions, more than one of which is written in the computer main memory prior to a probe phase and at least one of which is at least partially written to at least one computer disk when the main memory becomes substantially full;
      proposing one or more prospective swaps, wherein one or more partitions in main memory is a candidate for removal to the disk pursuant to the swap and one or more partitions on the disk is a candidate for removal to the main memory pursuant to the swap; and
      executing the swap if an efficiency is realized thereby.

35. The computer system of claim 34, wherein the overpartitioning step undertaken by the logic means further comprises:
   accessing a spill number "K" and determining the number "N" of build partitions $B_1, B_2, \ldots, B_N$ based at least in part on a product of the spill number "K" and a main memory overhead number "SpillOverhead" associated with staging, in main memory, at least one victim partition during the probe phase;
   applying a uniform hash function to the build table to establish the build partitions $B_1, B_2, \ldots, B_N$; and
   writing at least portions of the build partitions $B_1, B_2, \ldots, B_N$ into the main memory.

36. The computer system of claim 35, wherein the method steps undertaken by the logic means further comprise:
   selecting at least one build partition as a victim partition when the main memory is full prior to writing each partition in its entirety to main memory; and
   spilling the victim partition to the disk.

37. The computer system of claim 36, wherein the proposing step undertaken by the logic means further includes:
   designating at least some partitions as winners to be written from disk to main memory, and designating at least some partitions as losers to be written from main memory to disk.

38. The computer system of claim 37, wherein the step of selecting at least one build partition as a victim partition undertaken by the logic means further comprises:
   determining whether the main memory contains more than "T" blocks of at least one previously spilled partition, and if so, designating at least a largest one of any such previously spilled partitions as a victim partition;
   when the main memory does not contain more than "T" blocks of a previously spilled partition, determining whether the main memory contains more than "T" blocks of at least one previously unspilled partition, and if so, designating at least a largest one of any such previously unspilled partitions as a victim partition; and
   when the main memory does not contain more than "T" blocks of a previously unspilled partition, designating as a victim partition a largest partition in main memory with less than "T" blocks in main memory.

39. The computer system of claim 38, wherein the step of designating at least some partitions as winners and at least some partitions as losers further includes:
   initializing never-spilled build partitions as winners and initializing spilled build partitions as losers;
   randomly selecting one or more test winners and one or more test losers for a prospective swap, wherein test winners and test losers would exchange designations; and
   determining an efficiency savings of the prospective swap and designating test winners as losers and test losers as winners based on the efficiency savings, wherein a single winner partition can be swapped for more than one loser partition and a single loser partition can be swapped for more than one winner partition.

40. The computer system of claim 36, wherein after the victim partition is spilled to disk, blocks of the victim partition, subsequently processed during the step of applying a uniform hash function to the build table are written to main memory unless and until the victim partition is selected as a victim partition a second time.

* * * * *